Jan. 21, 1969   L. MULLER   3,422,916
SACK FILLING MACHINE
Filed April 6, 1967   Sheet 1 of 2

INVENTOR
Lothar Müller

BY Bailey, Stephens and Huettig
ATTORNEYS

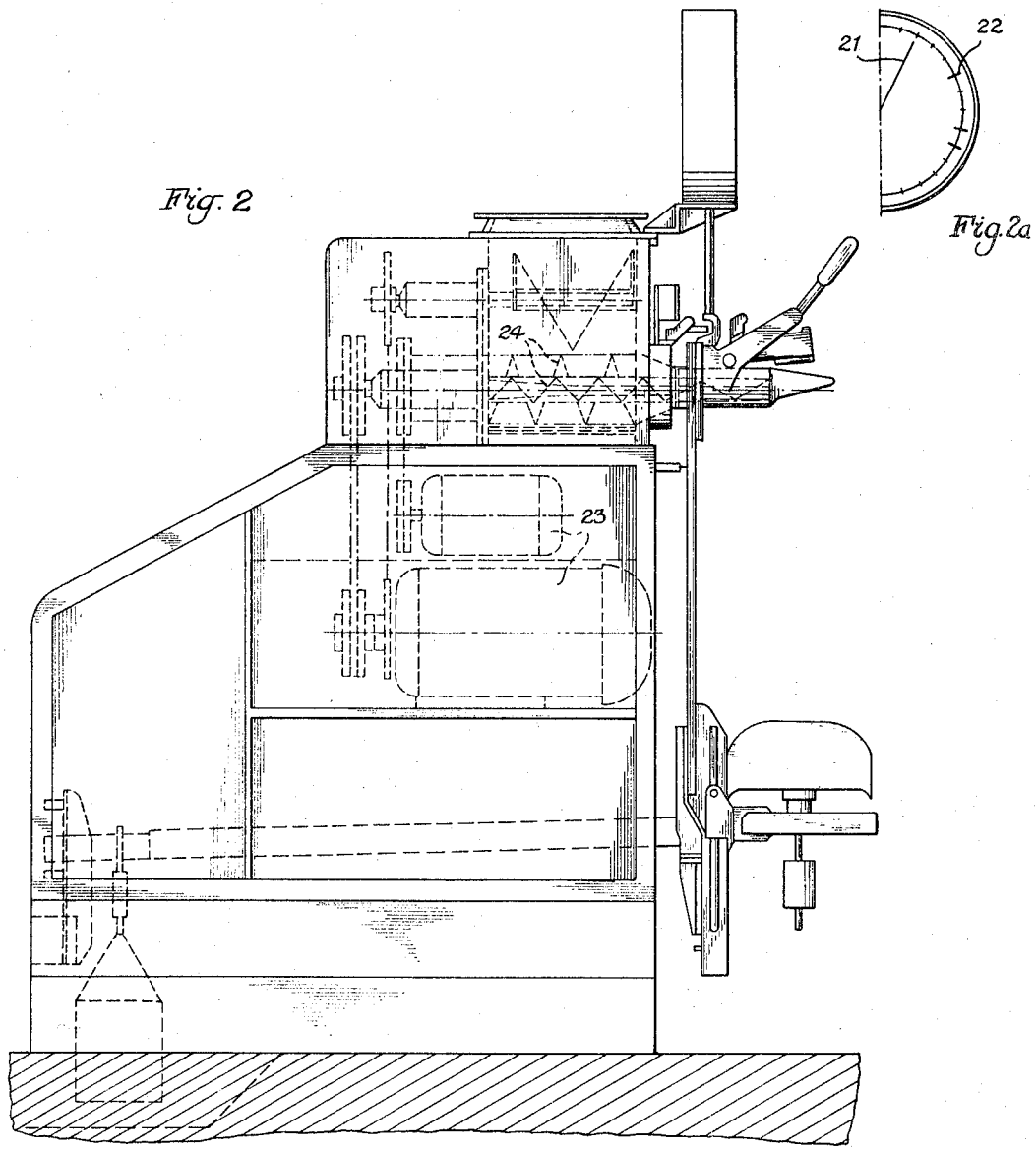

United States Patent Office 3,422,916
Patented Jan. 21, 1969

3,422,916
SACK FILLING MACHINE
Lothar Muller, Gartenstrasse 10, Wesseling,
Bezirk Cologne, Germany
Filed Apr. 6, 1967, Ser. No. 628,937
Claims priority, application Germany, Apr. 7, 1966,
D 49,813; Dec. 14, 1966, D 51,775
U.S. Cl. 177—122   2 Claims
Int. Cl. G01g 13/02; G01f 11/24

ABSTRACT OF THE DISCLOSURE

Adjustable valve means actuatable by a sack weighing scale are used to control the rate of the flow of filling material into a sack.

---

This invention relates to a valve-operated sack filling machine including a sack weighing scale.

In conventional valve-operated sack filling machines, the desired theoretical weight for the filled sack is determined by means of a balance beam scale having a corresponding counterweight positioned adjacent the machine. When the predetermined approximate weight of the filled sack has been reached, the material feeding tube over which the valve has been placed is partially closed about 10 to 20 mm. by means of a slide and sealing surface. The filling opening is thus of less size and only a smaller quantity of material per unit of time flows into the sack under reduced material flow or fine flow. When the approximate theoretical sack weight has been reached, then the hose is again partially closed to about 10 mm. so that the opening in the two slide surfaces is completely covered by the closed surface of the hose. The sack is then filled.

It is clear that an exact weighing of the sack is hindered by the closing of the feed tube and the movement of the scale beam and also because the sliding surface which is also a sealing surface has to slide by the stationary portion of the machine. Because, in most cases, shortly before the desired sack weight has been reached, the last portion of the material being put in the sack has to be forced or pressed into the sack and some of the material is mashed between the slide surface. Accurate weighing of many products is thus almost impossible. Sacks filled with a fine grained product having a light or loose weight of 200 grams per unit filled and weighed by the conventional valve-operated sack filling machines are not acceptable under government standards because the difference in the supply tube above the valve results in a weight variance which cannot be avoided in practice. The open balance beam scales customarily used with the valve-operated sack filling machines in the form of a box with a counterweight further add to the inaccuracy because of the accumulation of dust and crusts on the pans and weights.

The object of this invention is to avoid the disadvantages of the heretofore used machines by controlling the filling of the sack by means of a scale indicator which is adjusted to full or open flow, fine or reduced flow, or stoppage of flow with the weighing finished.

In general, the objects are accomplished by installing on the outlet side of the material feeding mechanism a three-step slide valve which can be actuated by the scale to be in fully opened position, throttled or reduced opening, and stoppage of opening.

In valve-operating sack filling machines using a screw feed because of the nature of the material being handled, the rotational speed of the screw can be reduced after a predetermined weight of material has been fed into the sack so that the material flow is reduced to fine flow, and when the desired weight of the sack has been reached, the screw is stopped.

The means by which the objects of the invention are obtained are described more fully with reference to the accompanying schematic drawings in which:

FIGURE 2 is a front view of a modified form of machine using a screw feed; and

FIGURE 2a is a side view of a portion of FIGURE 2.

Figure 1:
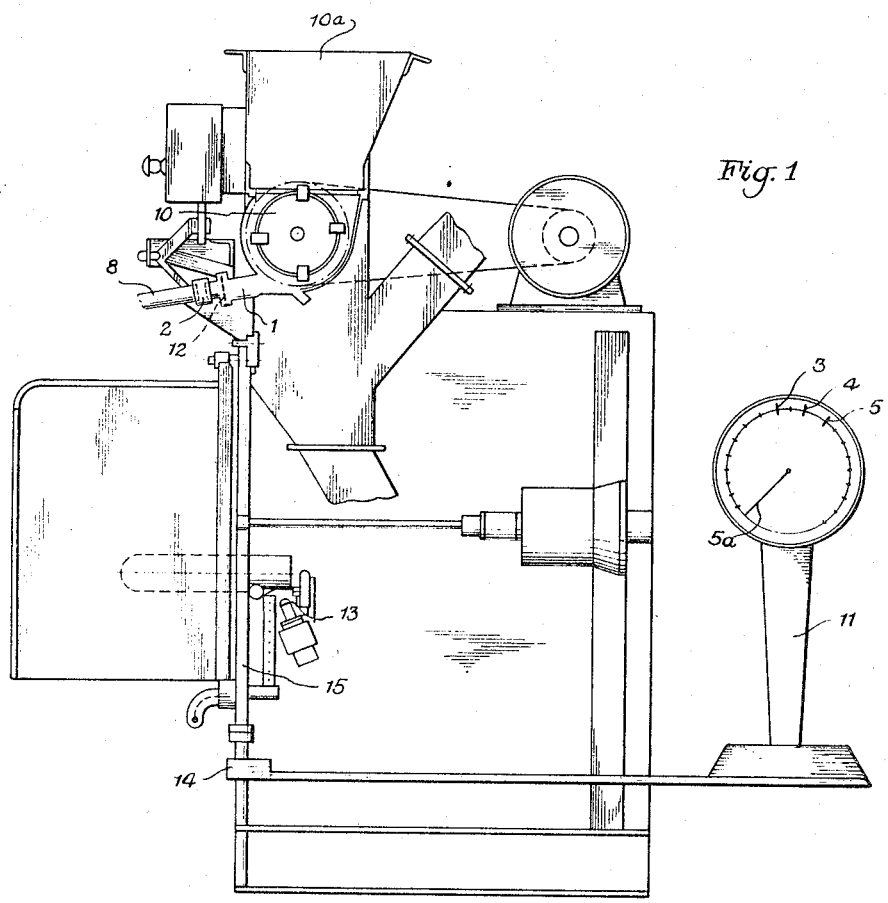
FIGURE 1 is a side view of the filling machine of this invention.
Figure 1A:
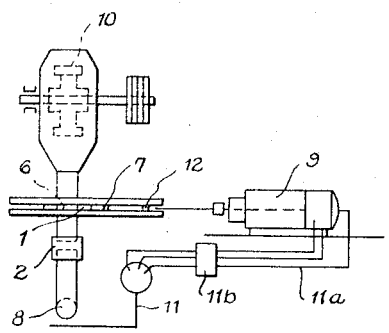
FIGURE 1a is a side view of a portion of FIGURE 1.

As shown in FIGURE 1, a feeding mechanism 10 feeds the material from a hopper 10a into a rigid pipe 1. This pipe is connected by a flexible hose connection 2 to a discharge hose 8. Adjustable electrical contacts 3, 4 and 5 are mounted on the face of the weighing scale 11. These contacts are adapted to be contacted by the pointer 5a for the purpose of energizing a motor 9. Wires 11a connect the contacts 3, 4 and 5 to motor 9. A time delay 11b is in this circuit. Motor 9 is joined to a slide valve 12 which has an opening 6 for full material flow and an opening 7 for fine material flow. Motor 9 can position the slide valve into the three positions of full flow, fine flow, and stoppage of flow. A sack ejecting member 13 is also provided. The sack being filled rests on the member 15 joined to the beam arm 14.

In operation, when the pointer 5a reaches the first contact 3 as, for example, when the material in the sack weighs 18 kg., then the three-step slide valve 12 is moved one step. This diminishes the cross-section of the discharge opening so that the material is fed at fine flow.

If the theoretical filled weight is, for example, 20 kg., plus 0.4 kg. tare weight, or 20.4 kg. is desired, then the slide valve 12 is moved a further step when the pointer 5a contacts the contact 4. This step closes the valve so that the flow of material is stopped. The time delay 11b permits the sack to remain in position for about another second. The sack is again weighed during the second. If the theoretical filled sack weight has not been reached because of the kinetic energy of the material flowing into the sack because of the first step, then the slide valve 12 is opened to fine flow and stays open until the theoretical weight has been reached. After this controlled filling, the filled sack is ejected by the member 13. The material feed is also shut off. The next empty sack is moved into position under the discharge hose and actuates a button to put the slide valve 12 into full flow position to start the filling of the sack. Since with conventional precision indicator scales the scale movement is only between 2 and 3 mm., the discharge hose can only be moved by that amount. This is easily achieved by means of the flexible hose connection 2 without incurring any weight variations.

The adjustable contacts 3, 4 and 5 can be quickly moved to different positions depending upon the desired weight of the filled sack.

If during this controlled weighing process the exact weight has not been reached, then the three-step slide valve goes into fine flow position until the weight desired has been reached. When the sack is overweight, then the contact 5 actuates a device for rejecting, marking or giving a warning signal.

In practice, it has been found that this adjustable weighing method can be successfully used with valve-operated sack filling machines having no supply mechanism. In such, there are two different types of machines, namely the so-called free falling flow packing machine and the air-operated packing machine. Only very easily flowing materials such as granules can be filled into sacks by means of the first, while with the latter, it is possible to fill heavy flowing goods since an advance container is mounted above the machine which places the material under the pressure of compressed air.

The disadvantages of inaccurate weight can be eliminated for these two machines by the use of the three-step slide valve and indicator scale of this invention to electrically control the full flow, fine flow, and stoppage of the material feed.

In sack filling machines in which, because of the nature of the material, a screw feed is used, the screw or double screws function as the three-step valve means. The signals for full flow, fine flow and stoppage of flow are again given for the contacts on the scale.

Such a screw machine is shown in FIGURE 2. In the operation of the machine in FIGURE 2, the machine can *only* be started by a push button at zero position (automatically regulated), that means with empty sack. The screw rotates at 800 r.p.m. When the pointer 21 on the scale face reaches, for example, 18 kg., the feed screw which is preferably driven by a variable speed synchronous motor 23 is reduced by the contact of the pointer 21 with the electrical contact 22 to a speed of 500 r.p.m. Because of this reduced speed, a smaller amount of material per unit of time is fed into the sack which is equivalent to a fine flow of the material. When the theoretical sack weight of, for example, 20 kg. is reached, then the motor is stopped by the contact of the pointer 21 with the corresponding electrical contact on the scale face. The weighing is completed.

As shown in FIGURE 2, the feed screw can be a double screw 24. This double screw is a center screw around which a larger hollow screw rotates.

Both screws rotate during full flow. Only one screw rotates during fine flow. This is either the outer or inner screw depending upon the material. The feeding of the material is finished by stopping both screws.

Having now described the means by which the objects of the invention are obtained,

I claim:
1. A machine for filling and simultaneously weighing a sack comprising material feeding means for filling the sack, a scale having a movable pointer for continuously weighing the sack while it is being filled, a three-step slide joined to said feeding means, adjustable electrical contact means on said scale engageable by said pointer for actuating said slide upon being selectively contacted by said pointer for changing the rate of feeding the material to the sack from full flow to fine flow and then to stoppage of flow, and time delay means joined to said electrical contact means for retarding for about one second a complete filling of the sack and during which time the sack is reweighed.

2. A machine as in claim 1, further comprising means for returning said slide valve to fine flow when said sack is underweight and for rejecting said sack when overweight.

References Cited

UNITED STATES PATENTS

| 2,033,586 | 3/1936 | Noble | 177—122 |
| 2,776,103 | 1/1957 | Bradley | 177—123 X |
| 2,844,349 | 7/1958 | Hudson | 177—122 |
| 3,095,055 | 6/1963 | McLauchlan | 177—123 X |

FOREIGN PATENTS 258,401  4/1913  Germany.

RICHARD B. WILKINSON, *Primary Examiner.*

G. H. MILLER, *Assistant Examiner.*

U.S. Cl. X.R.

222—238